United States Patent
Damera-Venkata et al.

(10) Patent No.: US 7,286,689 B2
(45) Date of Patent: Oct. 23, 2007

(54) MOTION ESTIMATION FOR COMPRESSION OF CALIBRATED MULTI-VIEW IMAGE SEQUENCES

(75) Inventors: Niranjan Damera-Venkata, Mountain View, CA (US); Nelson Liang An Chang, Palo Alto, CA (US); Debargha Mukherjee, San Jose, CA (US); Mei Chen, Los Altos, CA (US); Ken K. Lin, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 675 days.

(21) Appl. No.: 10/456,379

(22) Filed: Jun. 7, 2003

(65) Prior Publication Data

US 2004/0247159 A1   Dec. 9, 2004

(51) Int. Cl.
*G06K 9/00* (2006.01)
(52) U.S. Cl. .............. 382/107; 382/238; 382/343; 375/240.16
(58) Field of Classification Search ............. 382/243, 382/236, 238, 107; 375/340; 345/423
See application file for complete search history.

(56) References Cited

U.S. PATENT DOCUMENTS

| | | | |
|---|---|---|---|
| 6,144,701 A * | 11/2000 | Chiang et al. ............. | 375/240 |
| 6,205,241 B1 * | 3/2001 | Melen ........................ | 382/154 |
| 6,226,396 B1 * | 5/2001 | Marugame .................. | 382/154 |
| 6,266,158 B1 * | 7/2001 | Hata et al. .................. | 382/232 |
| 6,584,226 B1 * | 6/2003 | Chaddha et al. ............ | 382/236 |
| 6,628,419 B1 * | 9/2003 | So et al. .................... | 358/1.16 |
| 2002/0001406 A1 * | 1/2002 | Kochi et al. ................ | 382/154 |
| 2002/0110275 A1 * | 8/2002 | Rogina et al. .............. | 382/154 |
| 2004/0081239 A1 * | 4/2004 | Patti et al. ............. | 375/240.16 |
| 2004/0131267 A1 * | 7/2004 | Adiletta et al. ............. | 382/236 |
| 2004/0165781 A1 * | 8/2004 | Sun ............................ | 382/236 |

OTHER PUBLICATIONS

Mendonca et al, "Epipolar Geometry from Profiles under Circular Motion", Feb. 13, 2001, http://www.csis.hku.hk/~kykwong/publications/prsmendonca_pami01.pdf.*
Quddus et al, "A New Compression Technique for Binary Test Images", Jul. 1-3, 1997, IEEE Digital Object Identifier, Pertinent Pages: pp. 194-198.*
Wang et al, "Multiview Video Sequence Analysis, Compression, and Virtual Viewpoint Synthesis", Apr. 2000, IEEE Transaction on Circuits and Systems for Video Technology, vol. 1, No. 3.*

* cited by examiner

*Primary Examiner*—Samir Ahmed
*Assistant Examiner*—Andrae Allison

(57) ABSTRACT

A method for estimating motion of each of a plurality of tessels in an intermediate image relative to a reference image, which includes searching the reference image to find points that lie along epipolar lines in the reference image corresponding to upper-left and lower-right vertices of the tessel, respectively, that result in a best-matching shape; estimating a depth of each of at least two of the vertices of the tessel; and using the depth estimates of the at least two vertices of the tessel to estimate the motion of the tessel relative to the best-matching shape.

27 Claims, 4 Drawing Sheets

Reference frame R0    Intermediate frame Ik    Reference frame Rn

MOTION ESTIMATION FOR COMPRESSION OF CALIBRATED MULTI-VIEW IMAGE SEQUENCES

BACKGROUND

Motion estimation for video sequences is typically performed using a block motion model. Most video standards use a translational block motion model, wherein a block in the current frame is correlated with pixels in the next frame corresponding to possible translated positions of the block. A search for the best matching block in the next frame is performed. The vector displacement of the identified best matching block in the next frame, relative to the location of the corresponding block in the current frame, represents the block motion.

Block motion models other than translational block motion models have been proposed to compensate for inter-frame object rotation and perspective effects. These other block motion models are more accurate than translational block motion models, because a larger parameter space is searched to account for block shape changes in addition to block translation. The transformation parameters are directly obtained from the best matching shape (in terms of minimization of block prediction error). However, these other block motion models require more parameters as compared to a simple translational block motion model, which requires just two parameters.

With parametric block matching, shape distortions in the reference frames are related by a parametric transformation to the block to be matched in the current frame. However, parametric block matching motion estimation methods ignore the geometrical relationships that exist in the case of a calibrated multiple view image sequence. An example of a calibrated multiple view image sequence is an image sequence captured by a pre-calibrated camera of a rigid object on a rotating turntable. Another example is an image sequence captured by multiple calibrated cameras of the same static scene. These image sequences differ from general video sequences in that the objects/cameras/images are related by a known geometry.

Motion estimation methods that do not rely upon parametric block searching have been devised in order to take advantage of the known geometric relationships of multiple view image sequences to achieve improved compression performance. These methods take advantage of the fact that the displacement of a point from one view to the next depends only on its depth, once the internal and external camera parameters are known. These methods typically partition the frame to be predicted into square blocks. If a block in an intermediate view is assumed to have a constant depth $Z_{block}$, then by varying $Z_{block}$, displacement locations of the given block within a reference view are obtained.

The depth parameter $Z_{block}$ that leads to the best match is selected as the motion descriptor for that block. However, the assumption that all pixels within a block have the same depth limits the accuracy of the model.

SUMMARY

The present invention encompasses, in one of its aspects, a method for estimating motion of each of a plurality of tessels in an intermediate image relative to a reference image, which includes searching the reference image to find points that lie along epipolar lines in the reference image corresponding to upper-left and lower-right vertices of the tessel, respectively, that result in a best-matching shape; estimating a depth of each of at least two of the vertices of the tessel; and using the depth estimates of the at least two vertices of the tessel to estimate the motion of the tessel relative to the best-matching shape.

Other aspects and advantages of the present invention will become apparent from the following detailed description, taken in conjunction with the accompanying drawings, illustrating by way of example the principles of the present invention.

DETAILED DESCRIPTION

In general, in the case of calibrated multiple view images ("multi-view images"), the internal camera parameters (such as focal length, aspect ratio of the sensors, skew of the focal plane, and radial lens distortion), and external motion parameters (such as rotation and translation with respect to a reference camera position), are generally known to a high degree of precision and accuracy, or are generally easily obtained. Without loss of generality, consider the case of two views of a static scene obtained by a reference camera and another camera which has undergone a rotation R1 and a translation t1 with respect to the reference camera. If the respective internal parameters of the cameras are represented by K0 and K1, then the image of a world point X=(X,Y,Z,1) viewed through both cameras is related by the following equation (1):

$$x_1 = K_1 R_1 K_0^{-1} x_0 + (K_1 t_1)/Z, \qquad (1)$$

where $x_0$ is the projection of the world point X on the image formed by the reference camera, and $x_1$ is the projection of the world point X on the image formed by the other camera. The internal parameter matrices $K_0$ and $K_1$, do not account for nonlinear lens distortion, as it is assumed that all images are corrected for lens distortion based on camera calibration or that the corrections to be applied can be computed from calibration data. Lens distortion is not factored into equation (1) only for the sake of simplicity.

Figure 1:
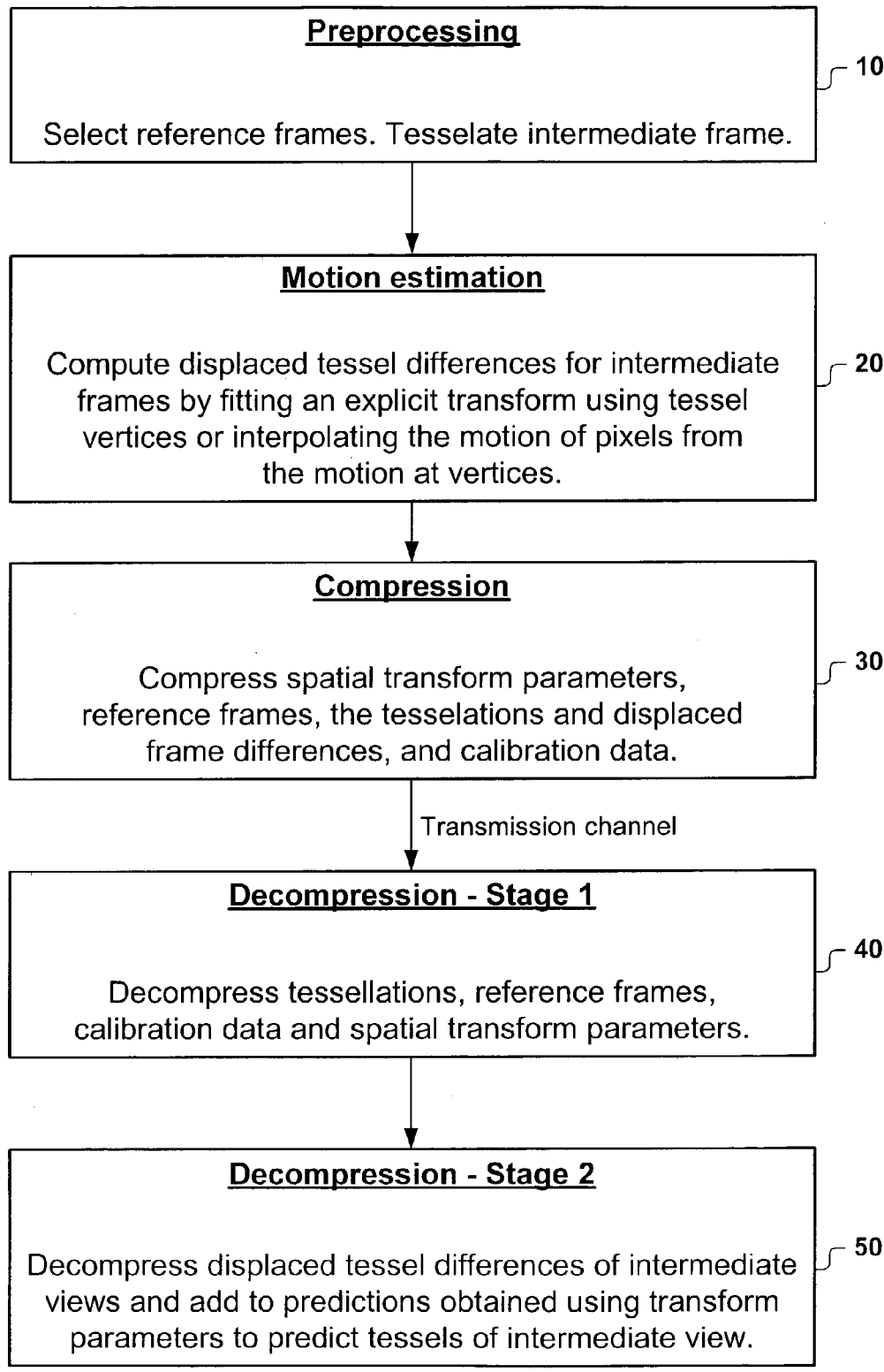
FIG. 1 is a flow chart diagram illustrating a method of an exemplary embodiment according to the present invention.

With reference now to FIG. 1, the method of a presently contemplated preferred embodiment of an image encoding/decoding method of the present invention consists of four basic stages (after calibration of the images), depicted in blocks, 10, 20, 30, 40/50, respectively, and discussed below under separate headings identified by respective Roman Numerals I-IV. It should be noted that in the case of an object on a rotating turntable, only three views need b e calibrated, namely, two views spaced as far apart as the generic reference views and one intermediate view that represents the smallest incremental view from the first reference view. The rotation and translation for all other views can be inferred from this calibration. The internal camera parameters are the same for all views, in the case in which all views are shot with the same camera.

I. Preprocessing

The first stage 10 of the method depicted in FIG. 1, which is referred to herein as "preprocessing," includes the following steps:

1) A set of reference frames is selected from all the views. This selection may be made by unifomly sampling the set of views or by non-uniformly sampling the set of views. In the case of non-uniform sampling, the reference views can be obtained by analyzing all the views and choosing the views to use as reference frames based on such criteria as, for example, joint minimization of occlusions, while maximizing the number of intermediate views, or views where reliable depth estimation was obtained;

2) The Fundamental Matrix $F_1^T$ relating an intermediate view $I_k$ to a reference view R0 is computed from known calibration data, with the world origin corresponding to the optical center of the camera with respect to the reference view R0, according to the following equation (2):

$$F_1^T = K_1^{-T}[t_1]_x R_1 K_0^{-1} \quad (2)$$

3) The intermediate view $I_k$ (to be predicted) is tesselated. If the simplest square tesselation is used, the image $I_k$ is simply divided into square tessels. For each vertex point $x_1$ in the intermediate view $I_k$, a corresponding point $x_0$ is searched along the epipolar line $I_0 = F_1 x_1$ in reference view R0. The points $x_1$ may be matched either by exhaustively traversing the epipolar line $I_0$ or by simply traversing the epipolar line segment in a neighborhood of $x_1$. The latter approach reduces matching complexity. Although neighboring information can be used to achieve local smoothness, the actual matching itself occurs along the epipolar line; and 4) From the point correspondences and the calibration data, the depth of the world point X corresponding to the imaged points $x_0$ and $x_1$, is determined from equation (1). This depth is the Z component of X.

Rather than using square tessels, any other tesselation scheme can be used. For example, the intermediate frame may be tesselated based on the points for which good point matches are obtained in the reference frame. These are points where the depth estimation is most reliable. The tessels in this case are polygons with vertices as points where the depth estimation is reliable.

II. Motion estimation

Figure 2:
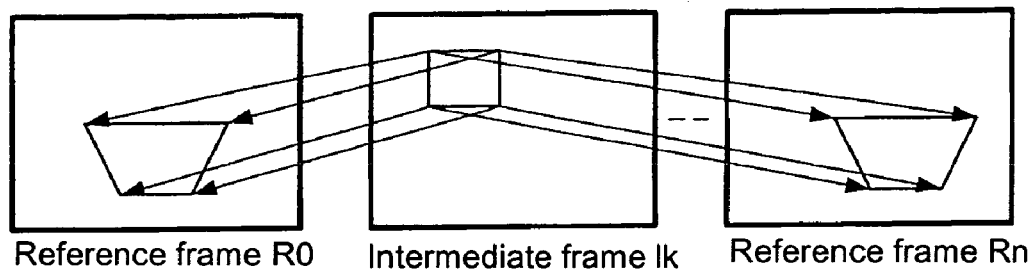
FIG. 2 is a diagrammatical illustration of a spatial transformation of an intermediate frame to a generalized shape of reference frames.

The second stage 20 of the method depicted in FIG. 1, which is referred to herein as "motion estimation," includes the following steps:

1) As depicted in FIG. 2, each tessel in an intermediate view Ik is transformed to a generalized shape by mapping the transformed tessel vertex-pixel locations to the respective vertex-pixel locations in a reference frame(s) R0, Rn, that results in the best-matching shape. How each of these tesselations map to generalized shapes can be determined by simply computing the best spatial transform for each tessel, thus guaranteeing smoothness within any shape for every synthesized view. The spatial transform is a function of the estimated depths Z of the vertices or vertex-points of the tessel. Once the spatial transform parameters for tessel transformation between the intermediate view Ik and reference view R0 are known, the spatial transforms between the intermediate view Ik and the reference view R0 can be computed. Known techniques for computing spatial transformations between shapes are described in a book entitled Digital Video Processing, by A. Murat Tekalp, published by Prentice Hall, 1995. As mentioned previously, the internal and external camera parameters for all frames are known a priori. However, the internal and/or external camera parameters can be estimated in the event they are not known a priori, for example, using techniques described in "Multiple view geometry in computer vision", by R. Hartley and A. Zisserman, Cambridge Univ. Press, 2001. The depth estimation of at least two verticles of a tessel of an intermediate frame Ik can then be used to interpolate the motion of pixels within the tessel. Alternatively, the motion of pixels within a tessel may be interpolated from the depth/motion of the vertex-points (vertices) without explicity computing a spatial transformation. An exemplary embodiment for an image sequence captured using a stationary camera and a rotating turntable, as described hereinafter, utilizes this latter approach; and 2) The transformed pixel locations are used to compute displaced frame differences, in a manner known to those having ordinary skill in the pertinent art. III. Compression More than one reference frame (e.g., reference frames R0 and Rn can be used for motion estimation of tessels of an intermediate frame Ik. This is analogous to bi-directional motion estimation for MPEG.

The third stage 30 of the method depicted in FIG. 1, is referred to herein as "compression." Since the motion of intermediate frames Ik is predicted relative to a reference frame(s) R0, Rn, fewer bits will be spent in coding the displaced frame differences than would be otherwise spent coding the intermediate frames Ik independently, thereby resulting in coding efficiency. If sparse depth estimation is performed, the coding overhead constitutes the bits used to code the tesselation (optional), and the bits spent to code the spatial transformation parameters for each of the tesselations apart from the bits spent coding the displaced frame differences, the reference frame(s), and the caliberation data. The compression of the displaced frame differences can be accomplished using known image compression algorithms, such as those described in the book entitled Digital Video Processing, to thereby generate a compressed bitstream.

IV. Decompression

The fourth stage 40 of the method depicted in FIG. 1, which is referred to herein as "decompression," includes the following steps:

1) First, in order to decompress the compressed bitstream, the reference images are decompressed, along with the tesselation data (for sparse depth estimation case), and the calibration data;

2) Second, in order to obtain an intermediate frame $I_k$, the displaced frame differences for the intermediate frame $I_k$, and the spatial transform parameters, are decompressed; and 3) The appropriate spatial transforms are applied to determine the pixels in the reference frame that predict the current tessel and the resulting values are added to the displaced frame differences.

Figure 3:
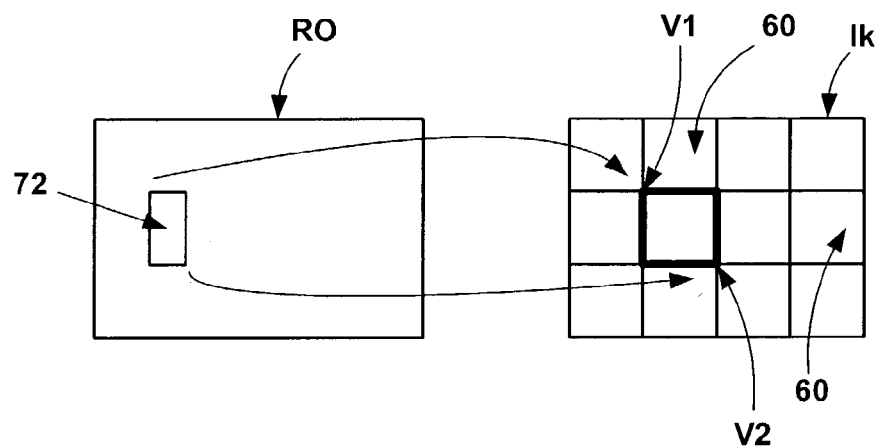
FIG. 3 is a diagrammatical illustration of a search of a rectangular search region in a reference image for a best-matching block relative to a square block in an intermediate image.

With reference now to FIG. 3, an exemplary embodiment of the present invention will now be described, for the case of capturing multiple images of an object rotating on a rotary turntable positioned in front of a stationary calibrated camera. In overview, in accordance with this exemplary embodiment, simple square tesselation is employed in order to partition an intermediate image $I_k$ to be predictively coded into a plurality of small square image tessels 60, e.g., 8×8 or 16×16 blocks. For each image tessel 60, the reference image(s) is (are) searched to find the points that lie along epipolar line(s) or line segment(s) in the reference image(s) corresponding to the upper-left and lower-right vertices of the tessel 60, respectively, that result in the best-matching shape(s). In the example depicted in FIG. 3, the best-matching shape found in the reference frame R0 is a rectangular block 72. The rectangular block 72 in the reference frame R0 may not be the same size as the current image tessel 60 being predictively coded. Therefore, prediction values for the current image tessel 60 being predictively coded are obtained by interpolation from adjacent pixel values in the rectangular block 72 in the reference frame R0.

The motion (and hence, implicitly, the depth Z) of the upper-left and lower-right vertices V1, V2 of the current image tessel 60 to be predictively coded, relative to the identified best matching shape in the reference frame R0, are computed. If the original positions of the upper-left and lower-right vertices of the current tessel 60 to be predictively coded are represented as $x_L$ and $x_R$, repectively, and the corresponding positions within the reference image R0 are represented as $x_L'$ and $x_R'$, respectively, then the x-components of the corresponding motion vectors are $\Delta x_L = x_L - x_L'$ and $\Delta x_R = x_R - x_R'$. The motion of a pixel x within the tessel 60 to be predictively coded is interpolated using linear interpolation as $\Delta x = \Delta x_L + (\Delta x_R - \Delta x_L)^*(x - x_L)/(x_R - x_L)$.

This motion prediction/estimation model is possible because of the known geometrical relationships between the images of the multi-view sequence, and between the images and the camera. As previously discussed, the internal and external parameters of the calibrated camera are known a priori. The angle of rotation θ of the turntable between shots (images) is also known. The object rotation is assumed to cause image displacement along the x-axis direction (i.e., horizontal displacement) only. However, it will be appreciated that a similar set of mathematical relations can be used to take into account vertical displacement as well.

Figure 4:
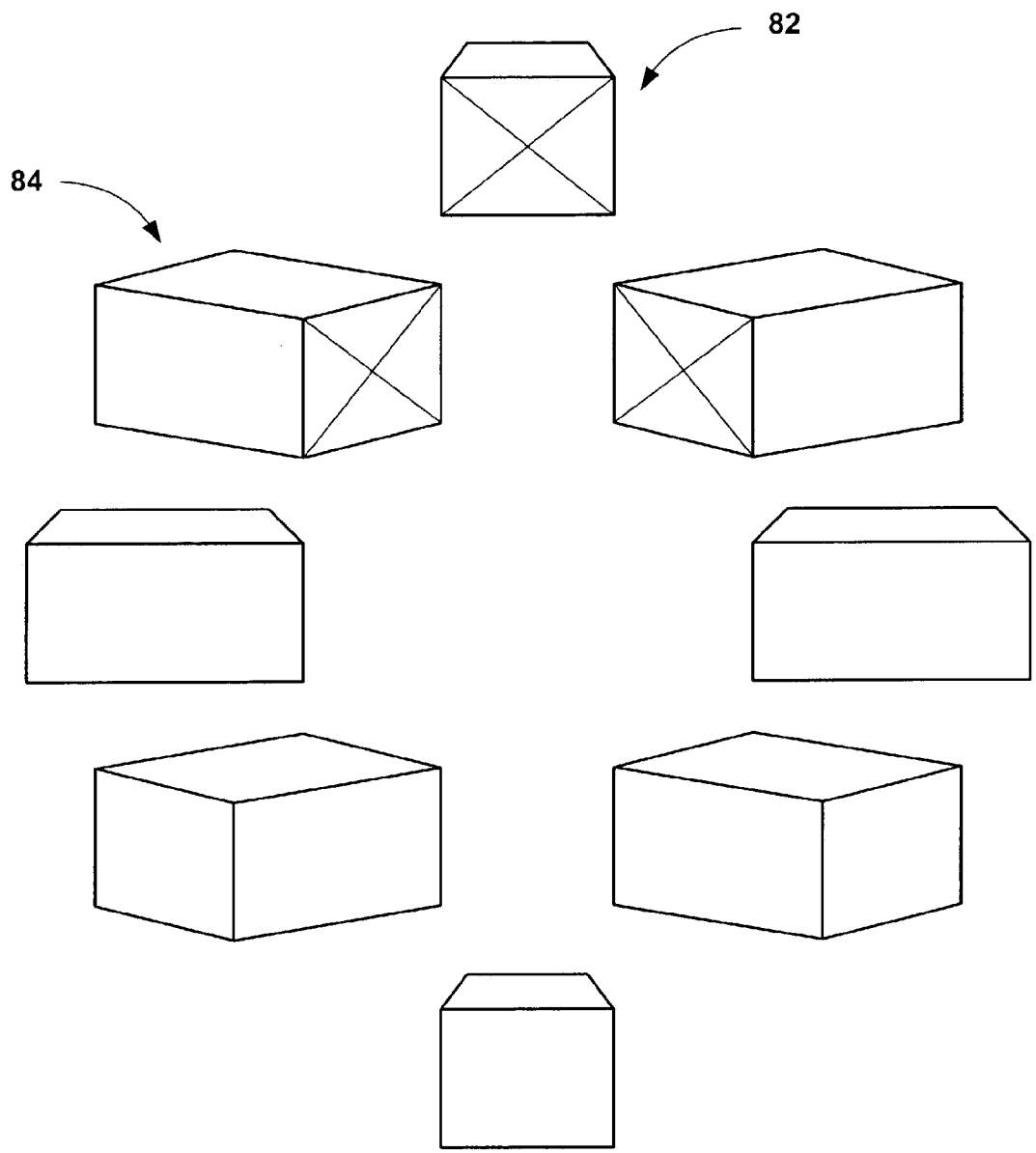
FIG. 4 is an illustration of a multi-view image sequence of an ojbect sitting on a rotary turntable, as captured by a stationary camera positioned in front of the rotary turntable.

With reference now to FIG. 4, there can be seen a sequence of images 80 of an object 82 sitting on a rotary turntable 84. Each of the images 80 constitutes a different view of the same object 82 captured by a stationary calibrated camera (not shown) after rotation of the turntable 84 by a rotation angle of θ, where θ=360°/N, and N represents the number of different images/views captured by the camera. In the exemplary case shown in FIG. 3, N is 8, and thus, θ=45°. Thus, each successive image 80 captures the object 82 from a viewpoint that is 45° apart from the viewpoint of the object 82 as captured in the previous image 80. Otherwise stated, the successive images 80 of the multi-view image sequence correspond to views of the object 82 corresponding to successive indexed (angular) positions of the turntable 84 relative to the stationary camera.

Figure 5:
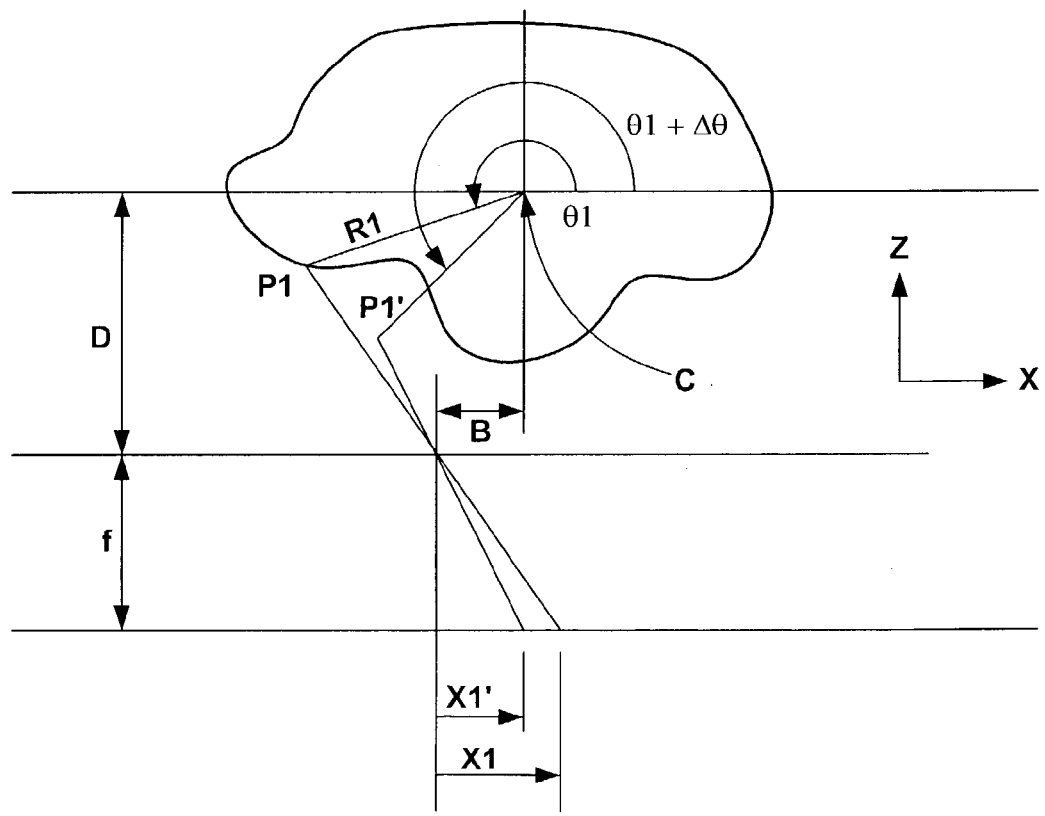
FIG. 5 is a diagram that illustrates the geometrical relationships that exist with respect to the camera-turntable arrangement used to capture the multi-view image sequence shown in FIG. 4.

With reference now to FIG. 5, there can be seen a diagram that illustrates the geometrical relationships that exist with respect to the camera-turntable arrangement used to capture the multi-view image sequence shown in FIG. 4, wherein D represents the distance between the object 82 and the camera; f represents the focal length of the camera lens; R1 represents the distance between a point of interest P1 and the center C of the turntable 84; θ1 represents the angular position of P1; θ1+Δθ represents the angular positions of P1', the same point of interest after rotation of the object 82 by an angle of rotation θ; and, Δθ=2π/N, and is a constant.

In the image plane, the x position of the projection of P1 (assuming D>>R1) is determined by the following equation (3):

$$x1 = f/D^*(-R1^*\cos\theta1 - B). \quad (3)$$

After rotation of the turntable 84 through an angle of rotation θ, the new x position, x1', of the projection of the point of interest P1 is determined by the following equation (4):

$$x1' = f/D^*(-R1^*\cos(\theta1+\Delta\theta) - B). \quad (4)$$

The x component of the motion vector for P1 is determined by the following equation (5)

$$\Delta x1 = x1' - x1 = f/D^*R1^*2^*\sin(\Delta\theta/2)^*\sin(\theta1+\Delta\theta/2). \quad (5)$$

In the exemplary embodiment under consideration, two motion vectors are transmitted for each image tessel to be predictively coded, one for the left edge of the tessel, and the other for the right edge of the tessel. Because the tessels are square, it is only necessary to determine the motion (and hence the depth Z) of the upper-left and lower-right vertices of each tessel in order to generate the two motion vectors corresponding to the opposite side edges thereof. Assuming that P1 and P3 represent the upper-left and lower-right vertices (end points) of a given tessel to be predictively coded in an image or frame captured at θ, and P2 is a point or pixel between P1 and P3, then the x components of the motion vectors for these three points are related according the following equation (6)

$$(\Delta x2 - \Delta x1)/(\Delta x3 - \Delta x1) = (R2^*\sin(\theta2+\Delta\theta/2) - R1^*\sin(\theta1+\Delta\theta/2))/(R3^*\sin(\theta3+\Delta\theta/2) - R1^*\sin(\theta1+\Delta\theta/2)) \quad (6)$$

Using linear interpolation to compute the motion vector for any pixel within the tessel, yields the following equation (7) for determining Δx2:

$$\Delta x2 = \Delta x1 + (\Delta x3 - \Delta x1)^*(x2-x1)/(x3-x1). \quad (7)$$

The expression (x2−x1)/(x3−x1) can be determined by the following equation (8):

$$(x2-x1)/(x3-x1) = (R2^*\cos\theta2 - R1^*\cos\theta1)/(R3^*\cos\theta3 - R1^*\cos\theta1). \quad (8)$$

In other words, equation (7) above is based upon the assumption represented by the following equation (9):

$$(R2^*\sin(\theta2+\Delta\theta/2) - R1^*\sin(\theta1+\Delta\theta/2))/(R3^*\sin(\theta3+\Delta\theta/2) - R1^*\sin(\theta1+\Delta\theta/2)) = (R2^*\cos\theta2 - R1^*\cos\theta1)/(R3^*\cos\theta3 - R1^*\cos\theta1). \quad (9)$$

The above equation (9), ignoring the small angle difference Δθ/2, implies that P2 lies on the line P1P3, which is a much better approximation than assuming that all three points P1, P2, and P3 are equidistant from the image plane (i.e., at the same depth Z), which is the assumption made to justify the traditional translation-only motion model (i.e., Δx2=Δx1=Δx3). In other words, when two motion vectors are used for predictively coding an image tessel based upon an estimation of the depth of the upper-left and lower-right vertices (corner or end-point pixels) of the tessel, the surface of the tessel is approximated to the first ($1^{st}$) order, whereas, with the translation-only motion model, the surface of the tessel is only approximated to the $0^{th}$ order. In all cases except the case where the vertices of the tessel are actually located at the same depth Z, the $1^{st}$ order motion prediction/estimation model is more accurate than the $0^{th}$ order motion prediction/estimation model.

The present invention allows for more general tessellations than square tessels, and allows motion/depth of tessels of images of a multi-view image sequence to be predicted on the basis of an estimation of the motion/depth of more than two vertices of the tessels being predictively coded.

The method of the present invention can be implemented in software, firmware, and/or hardware. For example, the method can be implemented in software (executable code) that is installed or instantiated on the processor of a host computer and/or the processor of an image forming device, such as a laser printer or laser printing system. Alternatively, the method can be implemented in a dedicated or specially-programmed logic device, such as an ASIC (Application Specific Integrated Circuit) or microcontroller.

Figure 6:
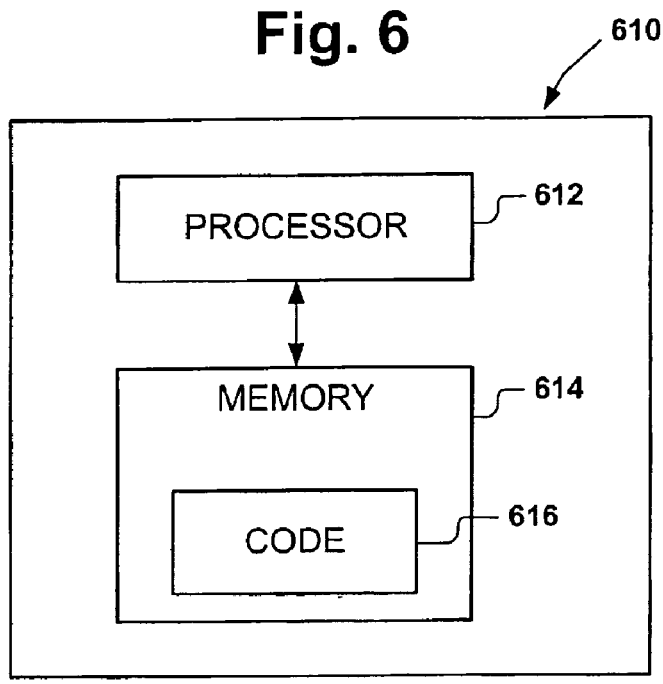
FIG. 6 is an illustration of an apparatus according to an embodiment of the present invention.

Reference is made to FIG. 6, which illustrates an exemplary machine 610 for implementing the method described above. The machine 610 includes a processor 612 and memory 614. The memory 614 contains code 616 for instructing the processor to carry out the method. The machine 610 can be a computer, camera, printer, etc.

The present invention, in its broadest aspects, is not limited to any particular context or application, but rather, is broadly applicable to any image processing application, e.g., computer systems, computer software, codecs, image capture systems, etc.

In general, although various illustrative embodiments of the present invention have been described herein, it should be understood that many variations, modifications, and alternative embodiments thereof that may appear to those having ordinary skill in the pertinent art are encompassed by the present invention, as defined by the appended claims.

What is claimed is:

1. A method for estimating motion of each of a plurality of tessels in an intermediate image relative to a reference image, the method comprising:
    searching the reference image to find points that lie along epipolar lines in the reference image corresponding to upper-left and lower-right vertices of the tessel, respectively, that result in a best-matching shape, wherein the intermediate image and the reference image are calibrated multiple view images of a static scene captured from different angles and related by known geometry;
    estimating a depth of each of at least two of the vertices of the tessel, wherein the depth is a distance from a point on an object in the scene to the center of a camera; and
    using the depth estimates of the at least two vertices of the tessel to estimate the motion of the tessel relative to the best-matching shape.

2. The method as set forth in claim 1, wherein the reference and intermediate images are captured by the camera having at least one internal parameter; and wherein the estimating the depth of each of at least two of the vertices of the tessel is performed using the at least one internal parameter of the camera.

3. The method as set forth in claim 2, wherein the at least one internal parameter is focal length.

4. The method as set forth in claim 1, wherein the images are separated by an angle of rotation θ; and wherein rotation and translation of the intermediate image relative to the reference image comprise external parameters.

5. The method as set forth in claim 1, wherein the estimating the depth of each of at least two of the vertices of the tessel is performed based upon geometrical relationships between the reference image and the intermediate image.

6. The method as set forth in claim 4, wherein the estimating the depth of each of at least two of the vertices of the tessel is performed using the external parameters.

7. The method as set forth in claim 4, wherein the estimating the depth of each of at least two of the vertices of the tessel is performed using the external parameters and the at least one internal parameter of the camera.

8. The method as set forth in claim 1, wherein intermediate and reference images are captured by the camera and represent an object is mounted on a turntable, and the turntable and the camera undergo a relative rotation of θ between successive image captures.

9. The method as set forth in claim 8, wherein the turntable comprises a rotary turntable, and the camera is a single stationary camera capturing the multi-view images.

10. The method as set forth in claim 8, wherein the turntable is stationary, and the multi-view image sequence is captured using a plurality of cameras.

11. The method as set forth in claim 1, wherein the estimating motion of each of the plurality of tessels in the intermediate image relative to the reference image further comprises using a spatial transform to map the at least two vertices of the tessel to corresponding points of the best-matching shape.

12. The method as set forth in claim 1, wherein the estimating motion of each of the plurality of tessels in the intermediate image relative to the reference image further comprises using a spatial transform to transform the shape of tessel to a shape of the best-matching shape.

13. The method as set forth in claim 1, wherein the estimating motion of each of the plurality of tessels in the intermediate image relative to the reference image further comprises using a spatial transform to transform the tessel to a generalized shape.

14. The method as set forth in claim 1, further comprising generating at least two motion vectors based upon the depth estimates of corresponding ones of the at least two vertices of the tessel.

15. The method as set forth in claim 14, further comprising compressing the motion vectors, the reference image, and the tessellations, and generating a compressed bitstream representative thereof.

16. The method as set forth in claim 14, further comprising compressing the motion vectors, spatial transform parameters, the reference image, and the tessellations, and calibration data indicative of internal and external camera parameters, and then generating a compressed bitstream representative thereof.

17. The method as set forth in claim 1, wherein the estimating motion of each of the plurality of tessels in the intermediate image relative to the reference image is accomplished without spatial transformations of the tessels.

18. The method as set forth in claim 1, wherein each of the tessels is a square tessel, and the at least two vertices of each tessel comprise opposite corners of the respective square tessel.

19. The method as set forth in claim 3, wherein the at least one internal camera parameter further includes aspect ratio, skew, and radial lens distortion.

20. A computer program stored on a computer-readable storage medium for performing the method set forth in claim 1.

21. Apparatus for estimating the motion of an intermediate image of a calibrated multi-view image sequence comprised of a plurality of images of an object captured by a camera, wherein each successive image is separated from the previous image by an angle of rotation θ, the apparatus comprising a processor and a computer readable medium storing a computer program executed by the processor to estimate motion of each of a plurality of tessels in the intermediate image relative to the reference image, the computer program comprising instructions for:

searching the reference image to find points that lie along epipolar lines in the reference image corresponding to upper-left and lower-right vertices of the tessel, respectively that result in a best-matching shape;

estimating a depth of each of at least two of the vertices of the tessel, wherein the depth is a distance from a point on the object to the center of the camera; and using the depth estimates of the at least two vertices of the tessel to estimate the motion of the tessel relative to the best-matching shape.

22. The apparatus as set forth in claim 21, wherein the depth of each of at least two of the vertices of the tessel is estimated by using the at least one internal parameter of the camera.

23. The apparatus as set forth in claim 21, wherein the depth of each of at least two of the vertices of the tessel is estimated from geometrical relationships between the reference image and the intermediate image.

24. The apparatus as set forth in claim 21, wherein the estimating motion of each of the plurality of tessels in the intermediate image relative to the reference image further comprises using a spatial transform to map the at least two vertices of the tessel to corresponding points of the best-matching shape.

25. The apparatus as set forth in claim 21, wherein the estimating motion of each of the plurality of tessels in the intermediate image relative to the reference image further comprises using a spatial transform to transform the shape of the tessel to a shape of the best-matching shape.

26. The apparatus as set forth in claim 21, wherein estimating motion of each of the plurality of tessels in the intermediate image relative to the reference image further comprises using a spatial transform to transform the tessel to a generalized shape.

27. A device for estimating the motion of an intermediate image of a calibrated multi-view image sequence comprised of a plurality of images of an object captured by a camera(s), wherein each successive image is separated from the previous image by an angle of rotation $\theta$, the device comprising:

means for selecting at least one of the images as a reference image(s);

means for tessellating the intermediate image into a plurality of tessels each having at least two vertices; and means for estimating motion of each of the plurality of tessels in the intermediate image relative to the reference images(s) by:

searching the reference image(s) to find points that lie along epipolar line(s) or line segment(s) in the reference image(s) corresponding to the upper-left and lower-right vertices of the tessel, respectively, that is result in a best-matching shape(s);

estimating a depth of each of at least two of the vertices of the tessel, wherein the depth is a distance from a point on the object to the center of the camera(s); and using the depth estimates of the at least two vertices of the tessel to estimate the motion of the tessel relative to the best-matching shape(s).

* * * * *

UNITED STATES PATENT AND TRADEMARK OFFICE
CERTIFICATE OF CORRECTION

PATENT NO. : 7,286,689 B2  Page 1 of 1
APPLICATION NO. : 10/456379
DATED : October 23, 2007
INVENTOR(S) : Niranjan Damera-Venkata et al.

It is certified that error appears in the above-identified patent and that said Letters Patent is hereby corrected as shown below:

In column 3, line 67, after "between" delete "the".

In column 4, line 13, delete "verticles" and insert -- vertices --, therefor.

In column 4, line 17, delete "explicity" and insert -- explicitly --, therefor.

In column 4, line 20, delete "turnable" and insert -- turntable --, therefor.

In column 4, line 32, delete "Rn" and insert -- (Rn) --, therefor.

In column 7, line 39, in Claim 1, after "by" insert -- a --.

In column 8, line 23, in Claim 12, after "shape of" insert -- the --.

In column 8, line 47, in Claim 17, delete "transformations" and insert -- transformation --, therefor.

In column 9, line 4, in Claim 21, insert -- , -- before "that".

In column 9, line 31, in Claim 26, insert -- the -- before "estimating".

In column 10, line 17, in Claim 27, delete "images(s)" and insert -- image(s) --, therefor.

In column 10, line 22, in Claim 27, after "that" delete "is".

Signed and Sealed this

Twenty-second Day of July, 2008

JON W. DUDAS
*Director of the United States Patent and Trademark Office*